(12) United States Patent
Mwanje et al.

(10) Patent No.: US 12,185,175 B2
(45) Date of Patent: Dec. 31, 2024

(54) SERVICE-CENTRIC MOBILITY-BASED TRAFFIC STEERING

(71) Applicant: NOKIA TECHNOLOGIES OY, Espoo (FI)

(72) Inventors: Stephen Mwanje, Dorfen (DE); Janne Tapio Ali-Tolppa, Taufkirchen (DE); Muhammad Naseer-Ul-Islam, Munich (DE)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 17/764,923

(22) PCT Filed: Sep. 22, 2020

(86) PCT No.: PCT/EP2020/076388
§ 371 (c)(1),
(2) Date: Mar. 29, 2022

(87) PCT Pub. No.: WO2021/063741
PCT Pub. Date: Apr. 8, 2021

(65) Prior Publication Data
US 2022/0386194 A1 Dec. 1, 2022

Related U.S. Application Data

(60) Provisional application No. 62/910,905, filed on Oct. 4, 2019.

(51) Int. Cl.
*H04W 36/00* (2009.01)
*H04W 36/22* (2009.01)
*H04W 36/30* (2009.01)

(52) U.S. Cl.
CPC ....... *H04W 36/22* (2013.01); *H04W 36/0083* (2013.01); *H04W 36/304* (2023.05)

(58) Field of Classification Search
CPC .......... H04W 36/00837; H04W 36/22; H04W 36/30; H04W 36/304; H04W 36/0083
See application file for complete search history.

(56) References Cited

U.S. PATENT DOCUMENTS

| | | | |
|---|---|---|---|
| 2015/0327131 A1* | 11/2015 | Teyeb | H04W 48/14 370/331 |
| 2017/0289047 A1* | 10/2017 | Szilágyi | H04L 41/5067 |
| 2017/0325120 A1* | 11/2017 | Szilagyi | H04L 41/5067 |
| 2017/0331670 A1 | 11/2017 | Parkvall et al. | |
| 2017/0332303 A1* | 11/2017 | Sunay | H04W 36/0085 |
| 2018/0262924 A1* | 9/2018 | Dao | H04W 72/535 |
| 2018/0368037 A1 | 12/2018 | Wang et al. | |
| 2019/0150150 A1* | 5/2019 | Calin | H04W 72/0453 370/329 |
| 2019/0158997 A1* | 5/2019 | Starsinic | H04L 12/14 |

OTHER PUBLICATIONS

Stephen S. Mwanje et al., "Distributed Cooperative Q-Learning for Mobility-Sensitive Handover Optimization in LTE SON," Computers and Communication (ISCC), 2014 IEEE symposium on. IEEE, 2014.

(Continued)

*Primary Examiner* — Dady Chery
(74) *Attorney, Agent, or Firm* — Barta Jones, PLLC

(57) ABSTRACT

Systems, methods, apparatuses, and computer program products for a service-centric mobility-based traffic steering.

11 Claims, 5 Drawing Sheets

(56) References Cited

OTHER PUBLICATIONS

Stephen Mwanje et al., "Network Management Automation in 5G: Challenges and Opportunities," in Proc. of the 27th IEEE International Symposium on Personal, Indoor and Mobile Radio Communications (PIMRC): Workshop: 6th International Workshop on Self-Organizing Networks (IWSON), Valenica, Spain, Sep. 4-7, 2016.

Stephen S. Mwanje et al., "Cognitive Cellular Networks: A Q-Learning Framework for Self-Organizing Networks," IEEE Transactions on Network and Service Management, vol. 13, Issue 1, pp. 85-98, Mar. 2016.

Andreas Lobinger et al., "Load Balancing in Downlink LTE Self-Optimizing Networks," 2010 IEEE Vehicular Technology Conference (VTC 2010-Spring). IEEE, 2010.

Krzysztof Grochla et al., "Load Balancing in LTE by Tx Power Adjustment," International Conference on Computer Networks. Springer, Cham, 2016.

Communication pursuant to Article 94(3) EPC dated Jun. 23, 2023, corresponding to European Patent Application No. 20780122.3.

International Search Report and Written Opinion dated Dec. 7, 2020 corresponding to International Patent Application No. PCT/EP2020/076388.

3GPP TR 28.861 V1.0.0 (Sep. 2019), Technical Report, 3rd Generation Partnership Project; Technical Specification Group Services and System Aspects; Telecommunication management; Study on the Self-Organizing Networks (SON) for 5G networks (Release 16), Sep. 2019.

\* cited by examiner

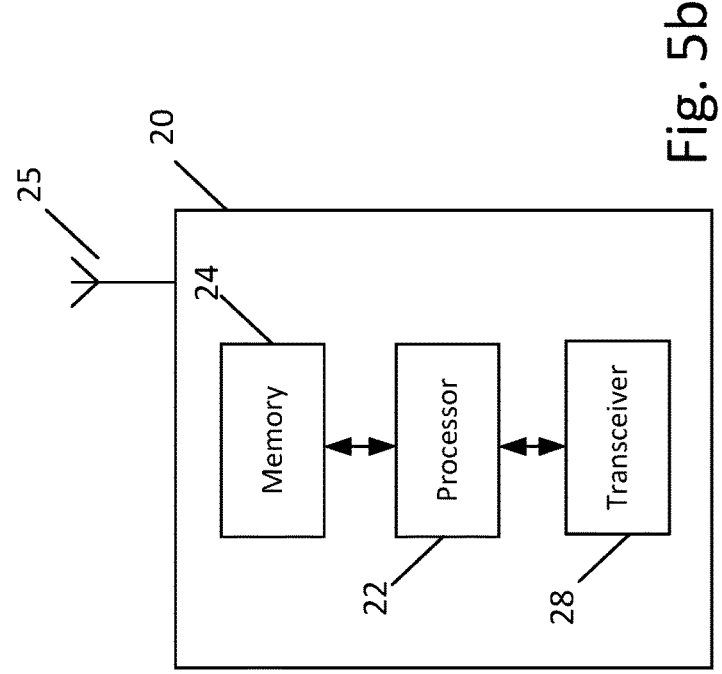
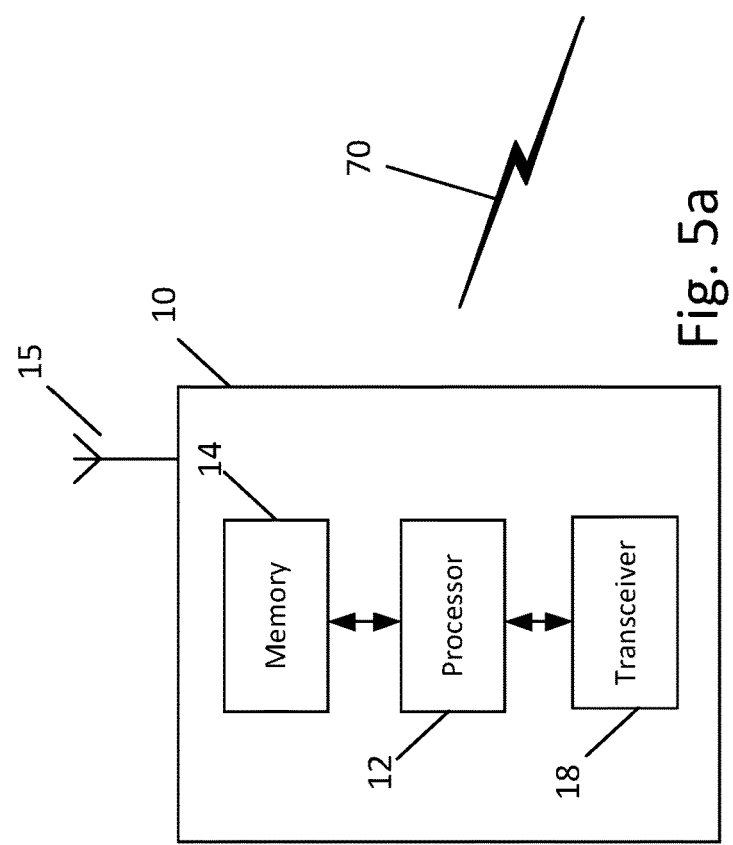

SERVICE-CENTRIC MOBILITY-BASED TRAFFIC STEERING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for service-centric mobility-based traffic steering.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein:

FIG. 5a illustrates an example block diagram of an apparatus, according to an embodiment; and FIG. 5b illustrates an example block diagram of an apparatus, according to another embodiment.

DETAILED DESCRIPTION

Figure 1:
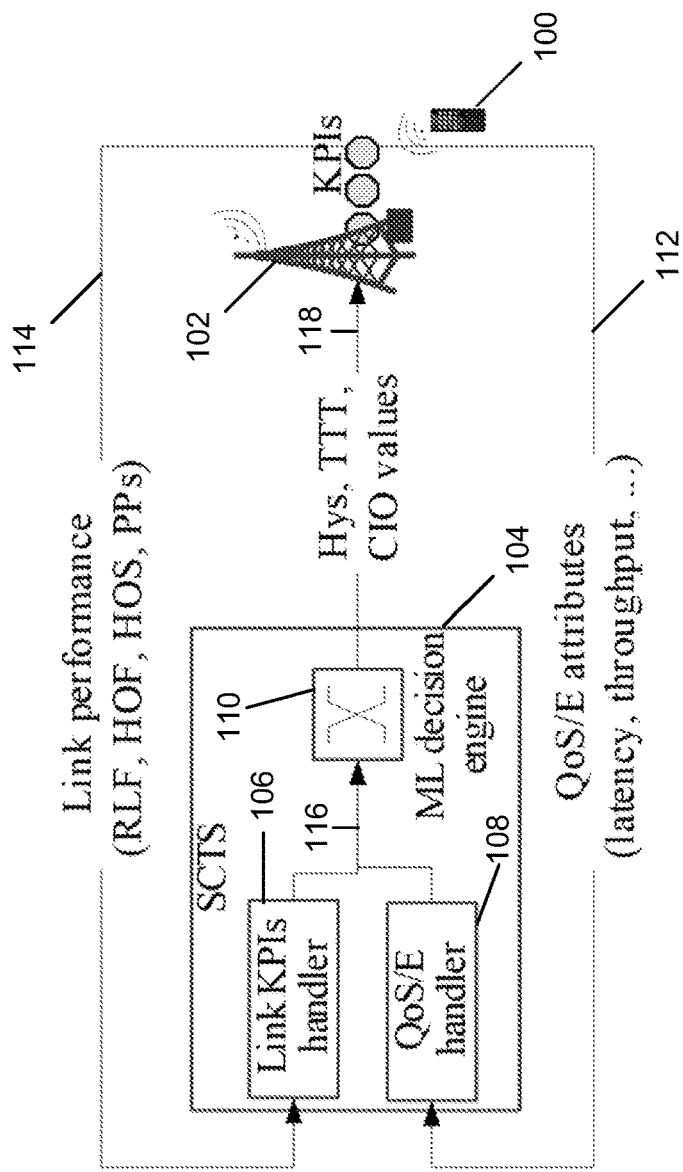
FIG. 1 illustrates an example of service-centric mobility robustness optimization (MRO), according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for service-centric mobility-based traffic steering, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Cognitive autonomous networks (CANs) may be used in 5G (radio access) networks and/or other future generations of wireless/mobile networks. As a paradigm for intelligent autonomy in networks, CANs may ensure that an operations, administration, and management (OAM) function may be able to 1) take higher-level goals and derive the appropriate performance targets, 2) learn from its environment and its individual and/or shared experiences therein, 3) learn to contextualize its operating conditions and/or, 4) learn its optimal behavior fitting to specific environments and/or contexts.

5G may support multiple services with differentiated service characteristics, the most widely considered service classes being extreme mobile broadband communications (eMBB), ultra reliable low latency communications (URLLC), and massive machine-type/Internet of things (IoT) communications.

One challenge in the management of a radio access network (RAN) may be the optimization of traffic handled by different cells. A number of procedures have been proposed for this as self-organizing network (SON) use cases, among which may be mobility robustness optimization (MRO) for optimizing handover trigger points, load balancing (LB) for distributing load among cells, and traffic steering (TS) for distributing load among different frequency layers. Corresponding cognitive approaches have been proposed for these use case. All of these, however, may still consider the default system where all services are treated the same as far as the optimization of radio resource management procedures. In the case of 5G, however, the different services may have to be dealt with differently (e.g., handover (HO) triggering for MRO, LB or TS may have to consider the services that may be executed, as may be provided for by certain embodiments described herein).

Mobility triggering may have to account for the services that are being handled. For a given user, the performance of a given cell may be acceptable if evaluated according to radio link characteristics like radio link failures (RLFs), handover ping pongs (PPs), or handover successes. However, the performance may be unacceptable when evaluated in terms of service characteristics, like end-to-end latency, throughput, packet loss, etc. For example, a cell A, with a very long latency, may be unusable for URLLC services, which have an upper bound on the end-to-end latency. Legacy LB and TS may account for throughput constraints, but from the perspective of the network (e.g., to redistribute the load among cells and layers but not to allow a user equipment (UE) to be served by the cell that maximizes the UE's service expectations). In this case, for example, another cell, B, with low latency may be preferred to cell A, even if cell B has a higher probability of RLFs when compared to cell A. This may be the case because as far as URLLC services are concerned, long latency may have as negative of an impact as a RLF. For example, even if the true count of RLFs is low, if each long latency event is counted as a RLF, the cell with few long-latency events may become preferable.

Service-specific optimization may also imply that, for a given service, the optimization may be done in a consistent way across the network (e.g., to consider network-wide events like packet loss or end-to-end latency). Consequently, there may be a need for a mechanism to coordinate the optimization among different cells.

Legacy MRO use cases may only consider radio link performance to optimize the HO trigger points. An MRO function may evaluate instantaneous, or historical, count or distribution of events like radio link failure, and may decide how to change the values of the HO trigger parameters that include the hysteresis (Hys) value, the time-to-trigger (TTT), and the cell-specific offset (CIO). The underlying HO triggering in the network node may include that the handover trigger points can be set differently for each user. The legacy MRO optimization function, however, does not differentiate among the different services that may be carried through a network node.

Some LB and TS use cases may consider the cell load to redistribute the load among cells with the intention to maximize an achieved user throughput. The LB/TS operations may evaluate the load in the cells to adjust the cells' CIO values with the intention to maximize the users' satisfaction in achieving the expected throughput. As with MRO, the legacy LB/TS operations do not differentiate among the services served by the users and, as such, do not consider the performance related to the other service-related metrics.

Some embodiments described herein may provide a solution that accounts for different services in the handover optimization decisions. For example, some embodiments may provide a service-centric traffic steering (SCTS) entity that may receive and process link performance data and/or quality of service (QoS) or quality of experience (QoE) data (QoS and QoE data may be referred to collectively as QoS/E data), and may determine optimal HO points for different kinds of services for a set of users (e.g., UEs). In addition, some embodiments may utilize a machine learning engine to account for different contexts in different cells and/or for different services, and/or may select handover settings for a UE under different cell and/or service contexts (e.g., a context may include a mobility profile, a packet size, and/or the like for a service or service class). This may allow for coordination of optimization among different cells, while considering the performance related to the other service-related metrics, thereby improving operations of a network with respect to handover optimization.

FIG. 1 illustrates an example of service-centric mobility robustness optimization (MRO), according to some embodiments. FIG. 1 illustrates a user equipment 100, a network node 102, and a SCTS entity 104 (that may include a link KPIs handler 106, a QoS/E handler 108, and a machine learning (ML) decision engine 110).

The network node 102 may provide, and the SCTS entity 104 may receive data. As illustrated at 112, the network node 102 may provide QoS/E data (e.g., that identifies QoS/E attributes, such as latency, throughput, and/or the like) for the UE 100. As illustrated at 114, the network node 102 may provide link performance data (e.g., that is related to RLFs, handover failures (HOFs), handover successes (HOSs), handover ping pongs (PPs), and/or the like. The link KPIs handler 106 may process the link performance data. For example, the link KPIs handler 106 may aggregate link performance data associated with radio links between multiple UEs 100. The QoS/E handler 108 may process the QoS/E data. For example, the QoS/E handler may process the QoS/E data to aggregate QoS/E data associated with multiple UEs.

The SCTS entity 104 may determine a handover trigger point (e.g., a value) for different kinds of services associated with the UE 100. For example, as illustrated at 116, the link KPIs handler 106 and the QoS/E handler 108 may provide the link performance data and/or the QoS/E data to the ML decision engine 110, and the ML decision engine 110 may process the data to determine the handover trigger point. Utilizing the ML decision engine 110 may improve optimization of handovers, may result in faster handover trigger determinations, and/or the like, which may improve an efficiency of use of network resources, such as bandwidth and/or network node processing resources. As illustrated at 118, the SCTS entity 104 may provide, and the network node 102 may receive, handover trigger points for one or more trigger parameters. For example, the one or more trigger parameters may include a hysteresis value, a time-to-trigger (TTT), or a cell-specific offset (CIO).

In this way, some embodiments described herein provide for SCTS via an SCTS entity 104. Besides taking in radio link performance data, the SCTS 104 may also take in QoS/E data from the different users to decide the optimal HO trigger points for different kinds of services that are carried by the users, which may improve operations of a network with respect to handover optimization. As described above, such QoS/E data may include the user's achieved throughput, radio-specific or end-to-end latency, packet losses, and/or any other service-related performance indicators. Additionally, or alternatively, the SCTS entity 104 may consider insights from a Mobility Pattern Prediction (MPP) service that provides predictions on the user mobility and/or the service they are expected to use.

Since SCTS may consider network-wide effects, but the observations on the radio interface may significantly vary when considered across multiple cells, the SCTS entity 104 may apply a machine learning operation (e.g., via the ML decision engine 110). For example, the machine learning operation may be capable of capturing insight from the different observations in order to derive the cell-specific, but network appropriate, configurations. In other words, the machine learning operations may account for different contexts in different cells and/or for different services, such as to derive a model that selects an appropriate (the most appropriate, in some embodiments) handover settings for each UE under these different cell and/or service contexts.

Candidate solutions for such a machine learning operation may use supervised learning, reinforcement learning, and/or the like.

There may be multiple options for implementing certain embodiments described herein. For example, certain embodiments may be implemented as an extension of legacy MRO/LB or TS operations of a network (as illustrated in, and described with respect to, FIG. 2 below), or as stand-alone functions alongside legacy operations (as illustrated in, and described with respect to, FIG. 3 below), and/or the like. Thus, certain embodiments described herein may allow for operation with legacy networks, which may improve the operations of the legacy networks with respect to handover optimization.

As described above, FIG. 1 is provided as an example. Other examples are possible, according to some embodiments.

Figure 2:
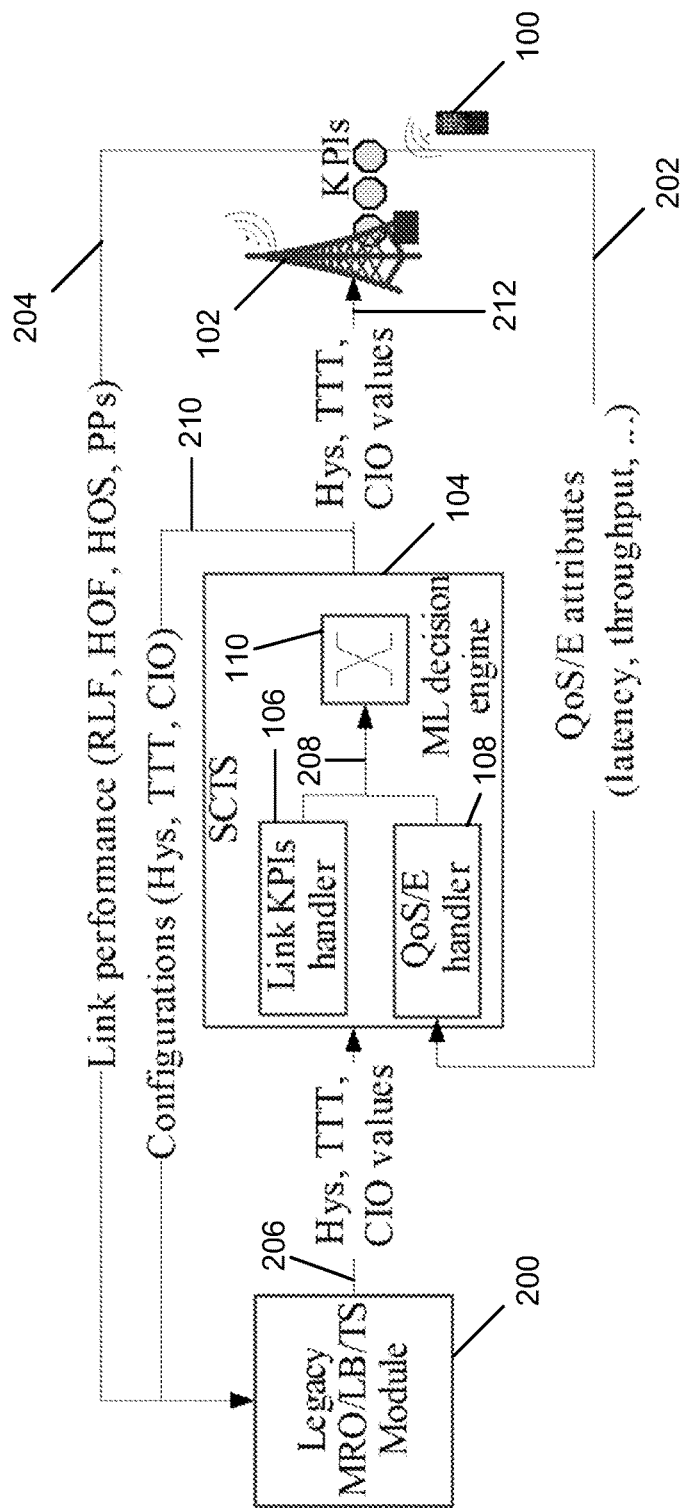
FIG. 2 illustrates an example of service-centric traffic steering (SCTS) as an inner loop optimization after MRO, load balancing (LB), and/or traffic steering (TS), according to some embodiments.

FIG. 2 illustrates an example of SCTS as an inner loop optimization after MRO, LB, and/or TS, according to some embodiments. For example, FIG. 2 illustrates an example implementation of certain embodiments as an extension of legacy MRO/LB or TS operations of a network (e.g., where the SCTS entity 104 may operate as an inner loop optimization after MRO, LB or TS). FIG. 2 illustrates a UE 100, a network node 102, and a SCTS entity 104 (e.g., that includes a link KPIs handler 106, a QoS/E handler 108, and a ML decision engine 110), similar to that described above with respect to FIG. 1. In addition, FIG. 2 illustrates a legacy MRO/LB/TS module 200 (e.g., that performs legacy MRO, LB, TS, and/or the like operations).

As illustrated at 202, the network node 102 may provide, and the SCTS entity 104 may receive, QoS/E data that is similar to that described above. As illustrated at 204, the network node 102 may provide, and the legacy MRO/LB/TS module 200 may receive, link performance data that is similar to that described above. The legacy MRO/LB/TS module 200 may process the link performance data to perform MRO, LB, TS, and/or the like operations.

As illustrated at 206, the legacy MRO/LB/TS module 200 may provide, and the SCTS entity 104 may receive, one or more trigger parameters that are similar to that described above. As shown at 208, the link KPIs handler 106 and/or the QoS/E handler 108 may provide the one or more trigger parameters, the QoS/E data, and/or output of processing the one or more trigger parameters and/or the QoS/E data to the ML decision engine 110. The ML decision engine 110 may update the one or more trigger parameters from the legacy MRO/LB/TS module 206 using machine learning operations. As shown at 210, the SCTS may provide configurations for the one or more trigger parameters to the legacy MRO/LB/TS module 200 (e.g., to update the legacy MRO/LB/TS module 200's operations with respect to determining the one or more trigger parameters). As illustrated at 212, the SCTS entity 104 may provide updated values for the one or more trigger parameters to the network node 102.

In this way, the SCTS entity 104 may extend the legacy MRO/LB/TS module 200 with a QoS/E handling module (e.g., the QoS/E handler 108) that may evaluate the appropriateness of the QoS/E data, and may characterize the degree to which the QoS/E performance expectations may be met by the serving cell or whether a target cell may offer a better chance of fulfilling those targets. This may improve operations of a legacy network with respect to handover optimization, which may result in improved handover triggers, reduced latency with respect to determining handover triggers, and/or the like, which may conserve network resources with respect to handovers and/or handover optimization. The values of attributes that may be submitted to the SCTS entity 104 may be aggregated within the SCTS entity 104 (e.g., by the QoS/E handler 108) or may be aggregated outside the SCTS entity 104, so that the QoS/E handler 108 focusses on the optimization task.

As indicated above, FIG. 2 is provided as an example. Other examples are possible, according to some embodiments.

Figure 3:
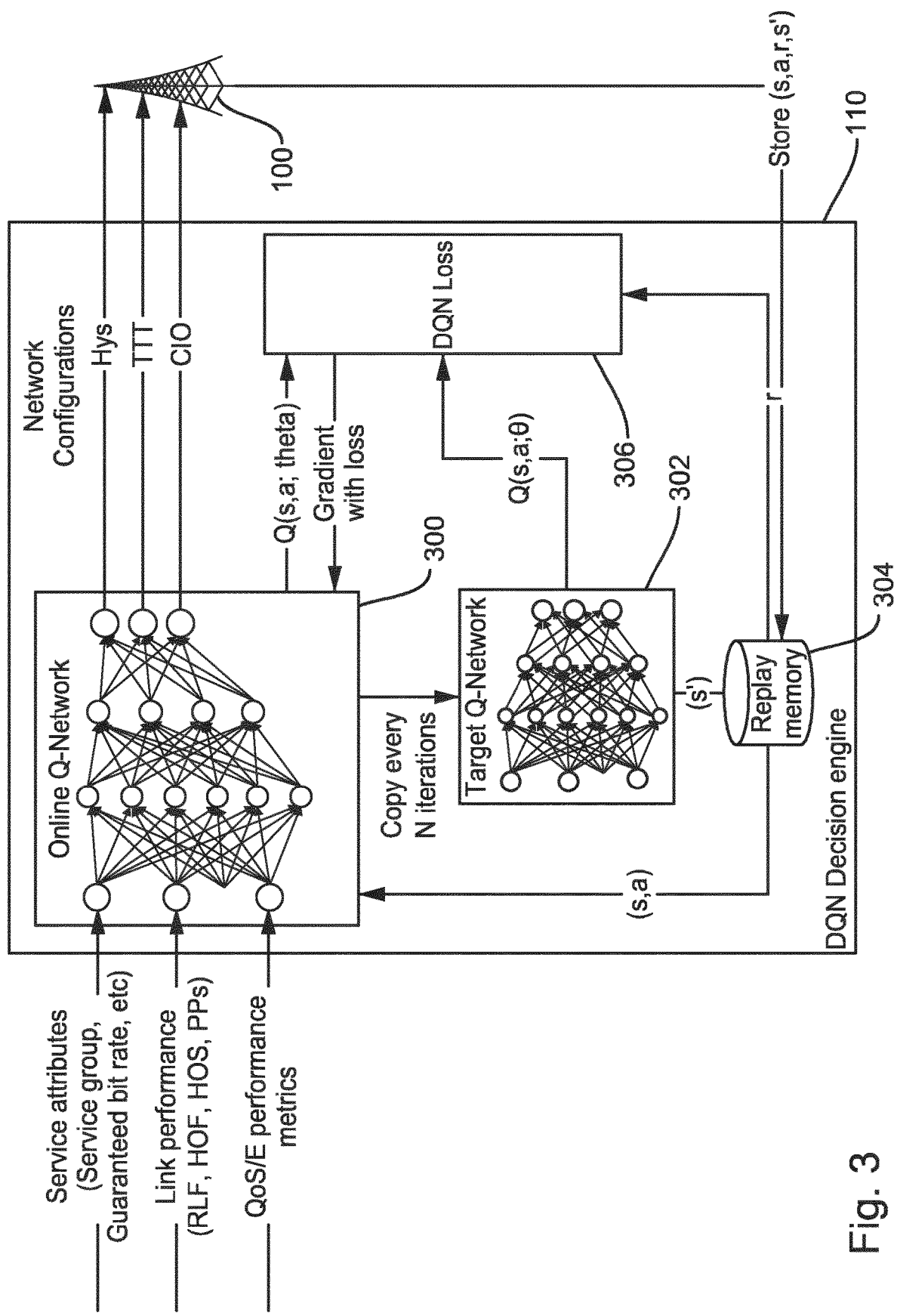
FIG. 3 illustrates an example deep Q-learning neural network (DQN) of a machine learning (ML) decision engine, according to some embodiments.

FIG. 3 illustrates an example deep Q-learning neural network (DQN) of the ML decision engine, according to some embodiments. FIG. 3 illustrates a network node 100 and a ML decision engine 110 (e.g., implemented as a DQN decision engine), similar to that described elsewhere herein. FIG. 3 further illustrates that the DQN decision engine 110 may include an online Q-network 300 (e.g., to process service attributes, link performance data, and/or QoS/E performance metrics), a target Q-network 302 (e.g., that provides added stability by separating action selection by the online Q-network 300 from policy evaluation by the target Q-network 302), a replay memory 304 (e.g., that stores transitions so that a set is randomly selected to make a batch used to train one or more of the Q-networks 300, 302, and that ensures that the transitions in the batch are de-correlates), and a DQN loss module 306 (e.g., that computes the loss for a given batch).

The SCTS entity 104 may have to consider each UE's supported service(s) in each cell and the effects that different mobility settings may have on that UE's service (or service mix). This may result in a diverse input parameter space, which may be complex to manage using rule-based operations. This diversity of observations may, however, be adequately handled by an ML-based decision engine (e.g., the ML decision engine 110).

The ML decision engine 110 may be a reinforcement learning module whose different input states may include the link performance and QoS/E data, expected service QoS/E characteristics, historical performance of related services in the different cells, and/or the like. The ML decision engine 110 may learn how to choose the right combination of handover parameters for the specific service over the multiple observations it makes in multiple cells at different time instances. This may provide improved handover optimization relative to legacy handover optimization.

An example implementation of the ML decision engine 110, illustrated in FIG. 3, may be a DQN decision engine that may take the link performance data and/or QoS/E data as input and may learn the appropriate neural network weights that may result in output HO settings that maximize a reward. For example, the reward may be a combination of low failure rates (e.g., RLF, HOF, etc.) and/or high service metrics (e.g., throughput, low latency, etc.).

The input may be the feature vector $\phi(s, a)$ that is a sample in observation space. The DQN, with a matrix of weights/parameters $\theta$, may implement the ML operations of policy evaluation and/or policy improvement, as described below. At a given time t, given an instantaneous reward $r_t$ following action a, in state $s_t$, the policy evaluation operation may include computing a temporal difference $\delta$ as in (1) below where there is a discount factor that balances between immediate and future rewards. The corresponding squared loss may be given by (2), below.

$$\delta \leftarrow r_t + \gamma \max_{a \in A}\left[\theta^T \phi(s_{t+1}, a)\right] - \theta^T \phi(s_t, a) \quad (1)$$

$$J(\theta) = \left\| r_t + \gamma \max_{a \in A} [\theta^T \phi(s_{t+1}, a)] - \theta^T \phi(s_t, a) \right\|^2 \quad (2)$$

The loss function may be minimized by computing the gradients $\nabla_\theta J(\theta)$. For the DQN, a target network may be maintained with parameters $\theta'$ that may be similar to the online network parameter $\theta$, but sampled every N operations. Correspondingly, the temporal difference may be given by (3), below, while loss gradient may be computed using stochastic gradient descent with the samples drawn from set a D in the replay memory. The gradients $\nabla_\theta J(\theta)$ may be computed using (4) below, which may then be used to update neural network parameters $\theta$ in (6).

$$\delta_t \leftarrow r_t + \gamma \max_{a \in A} Q[\phi(s_{t+1}, a); \theta'_i] - Q[\phi(s_t, a); \theta_i] \quad (3)$$

$$\nabla_{\theta_i} J(\theta_i) = E_{s_t, a_t, r_t, s_{t+1} \sim D} \left[ r_t + \gamma \max_{a \in A} Q[\phi(s_{t+1}, a); \theta'_i] - Q[\phi(s_t, a); \theta] \right] \cdot \quad (4)$$

$$\nabla_{\theta_i} Q[\phi(s_t, a); \theta]$$

Policy improvement may include the neural network parameters $\theta$ being updated as $\theta \leftarrow \theta - \alpha \nabla_\theta J(\theta)$, which may translate into (5), below. The Q-learning operation may then be completed by deriving policy $\pi(s)$ as in (6), below.

$$\theta_{t+1} = \theta_t + \alpha \delta_t \nabla_{\theta_t} Q[\phi(s_t, a); \theta_t] \quad (5)$$

$$\pi_t(s) \leftarrow \max_{a \in A} Q[\phi(s, a); \theta_t] \quad (6)$$

In certain embodiments, the ML decision engine 110 may comprise a supervised learning module that may be trained on service-related performance data for different users in different cells. The ML decision engine 110, in this case, may choose the appropriate output parameters at any time during the operations based on a trained model.

As described above, FIG. 3 is provided as an example. Other examples are possible, according to some embodiments.

Figure 4:
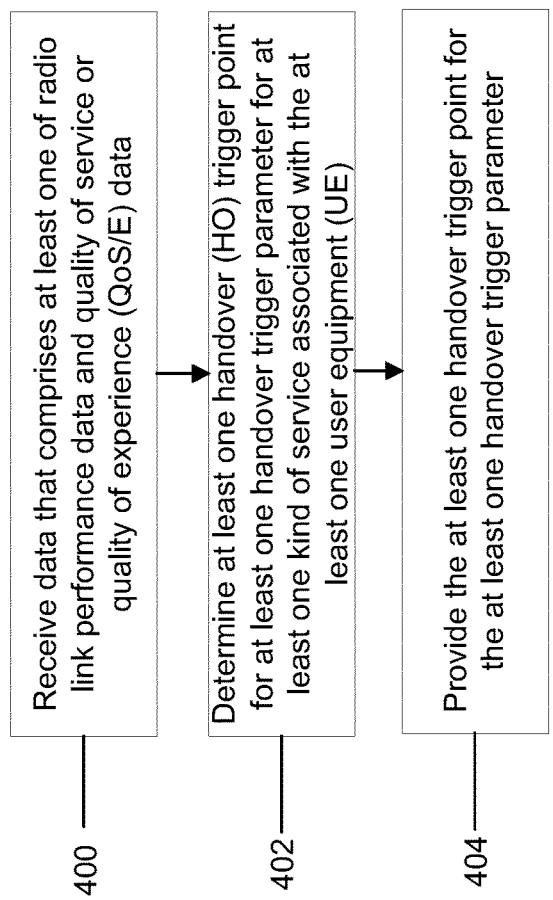
FIG. 4 illustrates an example flow diagram of a method, according to some embodiments.

FIG. 4 illustrates an example flow diagram of a method, according to some embodiments. For example, FIG. 4 shows example operations of a SCTS entity (e.g., similar to, or of, apparatus 20 of FIG. 5b). For example, FIG. 4 may illustrate example operations of a SCTS entity 104 described elsewhere herein. Some of the operations illustrated in FIG. 4 may be similar to some operations shown in, and described with respect to, FIGS. 1-3.

In an embodiment, the method may include, at 400, receiving data that comprises at least one of radio link performance data and quality of service or quality of experience (QoS/E) data. For example, the SCTS entity 104 may receive the data from a network node (e.g., network node 102). The radio link performance data may be associated with at least one radio link between at least one network node and at least one user equipment (UE). The quality of service or quality of experience (QoS/E) data may be associated with the at least one user equipment (UE).

In an embodiment, the method may include, at 402, determining at least one handover (HO) trigger point for at least one handover trigger parameter for at least one kind of service associated with the at least one user equipment (UE). For example, the SCTS 104 may determine the at least one handover (HO) trigger point after receiving the data. In an embodiment, the method may include, at 404, providing, to the network node, the at least one handover trigger point for the at least one handover trigger parameter. For example, the SCTS entity 104 may provide the at least one handover (HO) trigger point to the network node after determining the at least one handover (HO) trigger point.

In some embodiments, the at least one handover (HO) trigger parameter may include at least one of a hysteresis value, a time-to-trigger (TTT), or a cell-specific offset (CIO). In some embodiments, the quality of service or quality of experience (QoS/E) data may comprise data related to at least one of an achieved throughput for the user equipment (UE), a radio-specific or end-to-end latency for the user equipment (UE), or a packet loss associated with user equipment (UE). In some embodiments, the data may further comprise mobility pattern prediction (MPP) data.

In some embodiments, determining the at least one handover (HO) trigger point may comprise utilizing at least one machine learning decision engine to determine the at least one handover (HO) trigger point. In some embodiments, the at least one machine learning decision engine may consider at least one context in at least one cell for at least one service. In some embodiments, the SCTS entity may operate in conjunction with at least one legacy mobility robustness optimization (MRO)/load balancing (LB)/traffic steering (TS) module. In some embodiments, the method may further comprise aggregating the data for the at least one user equipment (UE). In some embodiments, the data may be received in an aggregated form.

As described above, FIG. 4 is provided as an example. Other examples are possible according to some embodiments.

FIG. 5a illustrates an example of an apparatus 10 according to an embodiment. In some embodiments, apparatus 10 may comprise a network node (e.g., a network node 102), as described elsewhere herein. In some embodiments, apparatus 10 may comprise a node, host, or server in a communications network or serving such a network. For example, apparatus 10 may comprise a network node, satellite, base station, a Node B, an evolved Node B (eNB), 5G Node B or access point, next generation Node B (NG-NB or gNB), and/or a WLAN access point, associated with a radio access network, such as a LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of FIGS. 1-4.

For instance, in one embodiment, apparatus 10 may be controlled by memory 14 and processor 12 to provide data to one or more other network entities. The data may include link performance data or QoS/E data. In an embodiment, apparatus 10 may be controlled by memory 14 and processor 12 to receive one or more handover trigger points for one or more handover parameters.

FIG. 5b illustrates an example of an apparatus 20 according to another embodiment. In some embodiments, apparatus 20 may comprise a SCTS entity (e.g., a SCTS entity 104), as described elsewhere herein. In some embodiments, apparatus 20 may comprise a node, host, or server in a communications network or serving such a network. For example, apparatus 20 may comprise a server in a data center, a computing node in a network, and/or the like. In some embodiments, the SCTS entity may be implemented as a computing node of apparatus 10 described above.

In some example embodiments, apparatus 20 may include one or more processors, one or more computer-readable storage medium (for example, memory, storage, or the like), and/or one or more radio access components (for example, a modem, a transceiver, or the like). In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, one or more operations described with respect to FIGS. 1-4.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a signal and for transmitting from apparatus 20. Apparatus 20 may further include a transceiver 28 configured to transmit and receive information. The transceiver 28 may also include a radio interface (e.g., a modem) coupled to the antenna 25.

The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may comprise a server, a computing node, and/or the like, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in, or described with respect to, any of FIGS. 1-4.

For instance, in an embodiment, apparatus 20 may be controlled by memory 24 and processor 22 to receive data that comprises at least one of radio link performance data and quality of service or quality of experience (QoS/E) data. The radio link performance data may be associated with at least one radio link between at least one network node and at least one user equipment (UE). The quality of service or quality of experience (QoS/E) data may be associated with the at least one user equipment (UE). In an embodiment, apparatus 20 may be controlled by memory 24 and processor 22 to determine at least one handover (HO) trigger point for at least one handover (HO) trigger parameter for at least one kind of service associated with the at least one user equipment (UE). In an embodiment, apparatus 20 may be controlled by memory 24 and processor 22 to provide the at least one handover (HO) trigger point for the at least one handover (HO) trigger parameter.

Therefore, certain example embodiments provide several technological improvements, enhancements, and/or advantages over existing technological processes. For example, one benefit of some example embodiments is an ability to account for different services in handover optimization decisions. Accordingly, the use of some example embodiments results in improved functioning of communications networks and their nodes and, therefore constitute an improvement at least to the technological field of handover optimization, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include receiving, by a service-centric traffic steering (SCTS) entity, data that comprises at least one of radio link performance data and quality of service or quality of experience (QoS/E) data. The radio link performance data may be associated with at least one radio link between at least one network node and at least one user equipment (UE). The quality of service or quality of experience (QoS/E) data may be associated with the at least one user equipment (UE). The method may include determining, by the service-centric traffic steering (SCTS) entity, at least one handover (HO) trigger point for at least one handover (HO) trigger parameter for at least one kind of service associated with the at least one user equipment (UE). The method may include providing, by the service-centric traffic steering (SCTS) entity and to the network node, the at least one handover (HO) trigger point for the at least one handover (HO) trigger parameter.

In a variant, the at least one handover (HO) trigger parameter may include at least one of a hysteresis value, a time-to-trigger (TTT), or a cell-specific offset (CIO). In a variant, the quality of service or quality of experience (QoS/E) data may comprise data related to at least one of an achieved throughput for the user equipment (UE), a radio-specific or end-to-end latency for the user equipment (UE), or a packet loss associated with user equipment (UE). In a variant, the data may further comprise mobility pattern prediction (MPP) data.

In a variant, the method may include determining the at least one handover (HO) trigger point comprises utilizing at least one machine learning decision engine to determine the at least one handover (HO) trigger point. In a variant, the at least one machine learning decision engine may consider at least one context in at least one cell for at least one service. In a variant, the SCTS entity may operate in conjunction with at least one legacy mobility robustness optimization (MRO)/load balancing (LB)/traffic steering (TS) module.

In a variant, the method may further comprise aggregating the data for the at least one user equipment (UE). In a variant, the data may be received in an aggregated form. In a variant, the data may further comprise one or more legacy-determined handover (HO) trigger points.

A second embodiment may be directed to an apparatus including at least one processor and at least one memory comprising computer program code. The at least one memory and computer program code may be configured, with the at least one processor, to cause the apparatus at least to perform the method according to the first embodiment, or any of the variants discussed above.

A third embodiment may be directed to an apparatus that may include circuitry configured to perform the method according to the first embodiment, or any of the variants discussed above.

A fourth embodiment may be directed to an apparatus that may include means for performing the method according to the first embodiment, or any of the variants discussed above.

A fifth embodiment may be directed to a computer readable medium comprising program instructions stored thereon for performing at least the method according to the first embodiment, or any of the variants discussed above.

An sixth embodiment may be directed to a computer program product encoding instructions for performing at least the method according to the first embodiment, or any of the variants discussed above.

What is claimed is:

1. A method, comprising:
    receiving, by a service-centric traffic steering (SCTS) entity, data that comprises at least one of radio link performance data and quality of service (QOS) or quality of experience (QoE) (QoS/E) data, wherein the radio link performance data is associated with at least one radio link between at least one network node and at least one user equipment (UE), and wherein the data further comprises mobility pattern prediction data, wherein the QoS/E data is associated with the at least one user equipment (UE), and wherein the QoS/E data comprises data related to the following: an achieved throughput for the UE, a radio-specific or end-to-end latency for the UE, and a packet loss associated with UE;
    determining, by the SCTS entity operating in conjunction with a legacy mobility robustness optimization (MRO)/load balancing (LB)/traffic steering (TS) module, at least one HO trigger point for at least one HO trigger parameter for at least one kind of service associated with the at least one UE, wherein determining the at least one HO trigger point comprises utilizing at least one machine learning decision engine to determine the at least one HO trigger point, wherein the at least one machine learning decision engine considers at least one context in at least one cell for at least one service, wherein the machine learning decision engine is configured to account for different contexts in different cells and for different services, and select HO settings for the UE under different cell and service contexts, where context includes a mobility profile and a packet size, and wherein the at least one HO trigger parameter includes the following: a hysteresis value, a time-to-trigger (TTT), and a cell-specific offset (CIO); and
    providing, by the SCTS entity and to the network node, the at least one HO trigger point for the at least one HO trigger parameter.

2. The method according to claim 1, further comprising: aggregating the data for the at least one UE.

3. The method according to claim 1, wherein the data is received in an aggregated form.

4. The method according to claim 1, wherein the data further comprises one or more legacy-determined HO trigger points.

5. An apparatus, comprising:
    at least one processor; and
    at least one memory including computer program code,
    wherein the at least one memory and the computer program code are configured to, with the at least one processor, cause the apparatus at least to:
    receive data that comprises at least one of radio link performance data and quality of service (QoS) or quality of experience (QoE) (QoS/E) data, wherein the radio link performance data is associated with at least one radio link between at least one network node and at least one user equipment (UE), wherein the QoS/E data comprises data related to the following: an achieved throughput for the UE, a radio-specific or end-to-end latency for the UE, and a packet loss associated with UE, and wherein the QoS/E data is associated with the at least one user equipment (UE);
    determine at least one HO trigger point for at least one HO trigger parameter for at least one kind of service associated with the at least one UE, wherein determining the at least one HO trigger point comprises utilizing at least one machine learning decision engine to determine the at least one HO trigger point, wherein the at least one machine learning decision engine considers at least one context in at least one cell for at least one service, wherein the machine learning decision engine is configured to account for different contexts in different cells and for different services, and select HO settings for the UE under different cell and service contexts, where context includes a mobility profile and a packet size, and wherein the at least one HO trigger parameter includes the following: a hysteresis value, a time-to-trigger (TTT), and a cell-specific offset (CIO); and
    provide the at least one HO trigger point for the at least one HO trigger parameter.

6. The apparatus according to claim 5, wherein the at least one memory and computer program code are further configured, with the at least one processor, to cause the apparatus to perform:
    aggregating the data for the at least one UE.

7. The apparatus according to claim 5, wherein the data is received in an aggregated form.

8. A computer program embodied on a non-transitory computer readable medium, said computer program comprising program instructions for causing an apparatus to perform at least the following:
    receiving data that comprises at least one of radio link performance data and quality of service (QOS) or quality of experience (QoE) (QoS/E) data, wherein the radio link performance data is associated with at least one radio link between at least one network node and at least one user equipment (UE), and wherein the data further comprises mobility pattern prediction data, wherein the QoS/E data is associated with the at least one user equipment (UE), and wherein the QoS/E data comprises data related to the following: an achieved throughput for the UE, a radio-specific or end-to-end latency for the UE, and a packet loss associated with UE;
    determining at least one HO trigger point for at least one HO trigger parameter for at least one kind of service associated with the at least one UE, wherein determining the at least one HO trigger point comprises utilizing at least one machine learning decision engine to determine the at least one HO trigger point, wherein the at least one machine learning decision engine considers at least one context in at least one cell for at least one service, wherein the machine learning decision engine is configured to account for different contexts in different cells and for different services, and select HO settings for the UE under different cell and service contexts, where context includes a mobility profile and a packet size, and wherein the at least one HO trigger parameter includes the following: a hysteresis value, a time-to-trigger (TTT), and a cell-specific offset (CIO); and providing the at least one HO trigger point for the at least one HO trigger parameter.

9. The apparatus according to claim 8, further comprising aggregating the data for the at least one UE.

10. The apparatus according to claim 8, wherein the data is received in an aggregated form.

11. The apparatus according to claim 8, wherein the data further comprises one or more legacy-determined HO trigger points.

\* \* \* \* \*